United States Patent [19]

Stewart et al.

[11] 4,228,702

[45] Oct. 21, 1980

[54] FILE GUIDE FOR USE IN SHARPENING A CHAIN SAW

[76] Inventors: Don S. D. Stewart, R.R. #3, Vandalia, Ill. 62471; Jack L. Ricke, R.R. #2, Fillmore, Ill. 62032

[21] Appl. No.: 38,482

[22] Filed: May 14, 1979

[51] Int. Cl.³ .................... B23D 63/10; B23D 63/16
[52] U.S. Cl. ........................................ 76/36; 76/25 A
[58] Field of Search ................... 76/25 A, 36, 31, 74

[56] References Cited

U.S. PATENT DOCUMENTS

| | | | |
|---|---|---|---|
| 2,813,438 | 11/1957 | Paradis et al. | 76/31 |
| 3,322,000 | 5/1967 | Newman | 76/36 |
| 3,670,600 | 6/1972 | Arff | 76/36 |
| 3,744,349 | 7/1973 | Juncker | 76/25 A |

Primary Examiner—Othell M. Simpson
Assistant Examiner—Roscoe V. Parker
Attorney, Agent, or Firm—Senniger, Powers, Leavitt and Roedel

[57] ABSTRACT

A file guide for use in sharpening a chain saw having a bar, a chain around the periphery of the bar, and a plurality of teeth secured at intervals along the chain, each tooth having a cutting edge at one end thereof constituting its forward end. The file guide comprises a frame adapted to be mounted on the bar of the chain saw, a carriage slidably mounted on the frame for forward and rearward movement relative to the tooth to be sharpened, and a stop carried by the frame for holding the tooth against rearward movement. The carriage has a pair of guide members guiding a file for reciprocation at a predetermined angle relative to the tooth through a cutting stroke of the file for sharpening the tooth at the predetermined angle and a return stroke. The guide members are disposed on opposite sides of the tooth and are spaced longitudinally of the carriage. The carriage is movable rearward so as to position the file in engagement with the cutting edge of the tooth for the cutting stroke of the file and is movable forward so as to position the file out of engagement with the cutting edge of the tooth for the return stroke of the file.

16 Claims, 4 Drawing Figures

FILE GUIDE FOR USE IN SHARPENING A CHAIN SAW

BACKGROUND OF THE INVENTION

This invention relates to a guide for a file, and more particularly to a guide for use in sharpening the teeth on a chain saw.

In sharpening the teeth of a chain saw, it is desirable that the teeth be sharpened at a particular predetermined angle from the direction of movement of the teeth and, whatever angle is selected, especially important that all of the teeth be sharpened at the same angle. For these purposes, various file guides have been devised for guiding a file for manual sharpening of the teeth of a chain saw. Such file guides are typically mounted on the bar of the chain saw and guide the file at a predetermined angle relative to the cutting edge of each tooth on the chain. Certain of these file guides, such as those shown in U.S. Pat Nos. 3,744,349 and 3,322,000, also have a tooth stop for holding each tooth, in the desired position relative to the file, so that each tooth can be sharpened to a predetermined depth. A problem with the prior art guides has been their failure to guide the file and to position the tooth to be sharpened relative to the file with sufficient accuracy and consistency to ensure that all the teeth on the chain are sharpened at the same angle and to the same depth. A chain saw having teeth with cutting edges sharpened at differing angles will not cut through a piece of wood in a straight line but, rather, will cut in a curved line, because chain saws turn while cutting toward the side of the bar having the greater number of sharply angled teeth. In an extreme case, the chain saw will bind against the sides of the cut in the wood. If a chain saw has teeth that are not sharpened to a uniform depth, the saw will not run smoothly, in that some teeth will cut relatively deeply into the wood, while other teeth cut lightly, if at all, into the wood. A problem with the prior art file guides using reciprocal files, such as the file guide in U.S. Pat. No. 3,322,000, has been abrasion arising from movement of the file past the guide member. Thus, either the file abrades away the guide, thereby changing the sharpening angle and/or depth of sharpening, or the file is dulled by the guide, thereby reducing the useful life of the file. A problem with the prior art file guides using a rotary file, such as the file guide in U.S. Pat. No. 3,744,349, is that the replacement rotary files for the guides are relatively expensive specialty items.

SUMMARY OF THE INVENTION

Among the several objects of this invention may be noted the provision of an improved file guide by use of which the sharpening of all teeth on a chain saw can accurately be done at the same cutting angle and to the same depth; the provision of such a file guide which can be utilized on chain saws of differing sizes; the provision of such a file guide which neither abrades the file nor is abraded by the file; the provision of such a file guide which "cleans" the metal shavings from the file to extend its useful life and improve its efficiency; and the provision of such a file guide which is of economical construction.

Briefly, the file guide of this invention is for use in sharpening a chain saw which saw comprises a bar, a chain around the periphery of the bar, and a plurality of teeth secured at intervals along the chain each having a cutting edge at one end thereof constituting its forward end in respect to the direction of movement of the chain. The file guide comprises a frame adapted to be mounted on the bar of a chain saw having means for releasably securing it to the bar of the chain saw, a carriage slidably mounted on the frame for forward and rearward movement relative to the cutting edge of the tooth to be sharpened, and a stop carried by the frame for holding the tooth against rearward movement. The carriage has means for guiding a file for reciprocation at a predetermined angle relative to the tooth through a cutting stroke for sharpening the tooth at the predetermined angle and a return stroke. The means for guiding the file comprises a pair of guide members spaced longitudinally of the carriage, one member being on one side of the tooth and the other on the other side of the tooth. The carriage is movable rearward so as to position the file in engagement with the cutting edge of the tooth for the cutting stroke of the file and being movable forward so as to position the file out of engagement with the cutting edge of the tooth for the return stroke of the file.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
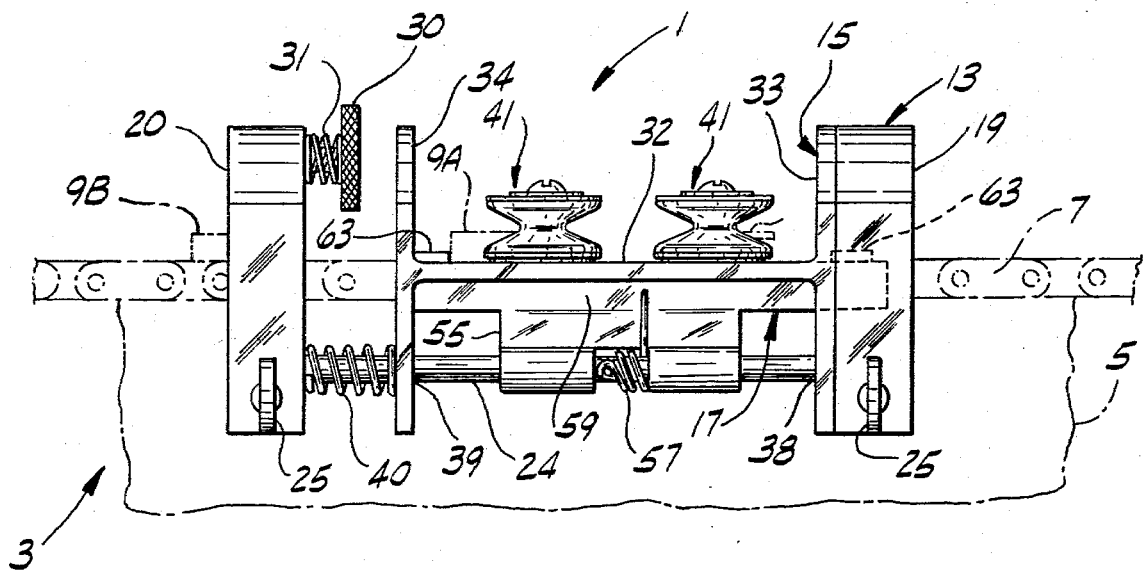
FIG. 1 is an elevation of a file guide of this invention showing the guide mounted on the bar of a chain saw and a carriage of the guide in its forward position.

Referring to the drawings, there is generally indicated at 1 a file guide of this invention adapted for use in sharpening a chain saw 3 which saw comprises a bar 5, a chain 7 around the periphery of the bar, and a plurality of teeth 9 secured at intervals along the chain. Each tooth 9 has a cutting edge 11 at one end thereof constituting its forward end in respect to the direction of movement of the chain 7. Successive teeth 9A and 9B are allochiral relative to each other and arranged on opposite sides of the chain. Teeth 9A and 9b have cutting edges 11A and 11b, respectively, angled toward opposite sides of the bar 5.

The file guide 1 comprises a frame 13 adapted to be mounted on the bar 5 of the chain saw 3, a carriage 15 slideable mounted on the frame 13 for forward and rearward movement relative to the tooth 9A to be sharpened, and a stop 17 carried by the frame 13 for holding the tooth 9A against rearward movement.

Figure 3:
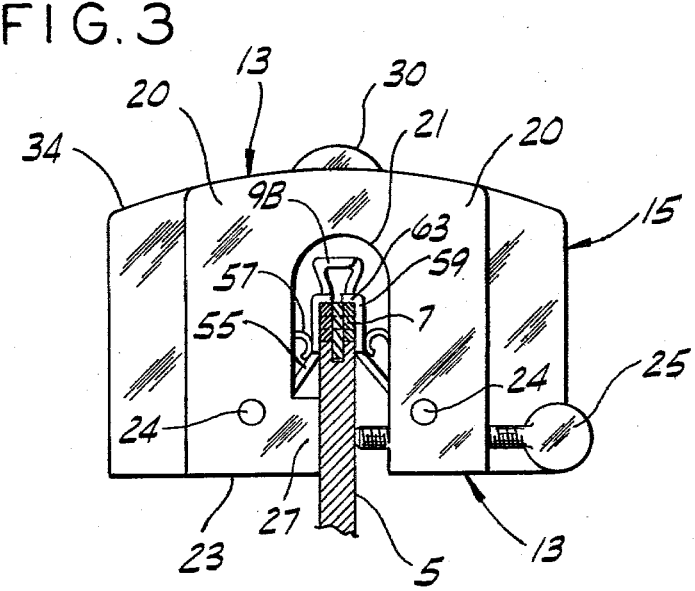
FIG. 3 is a left end view of the file guide.
Figure 4:
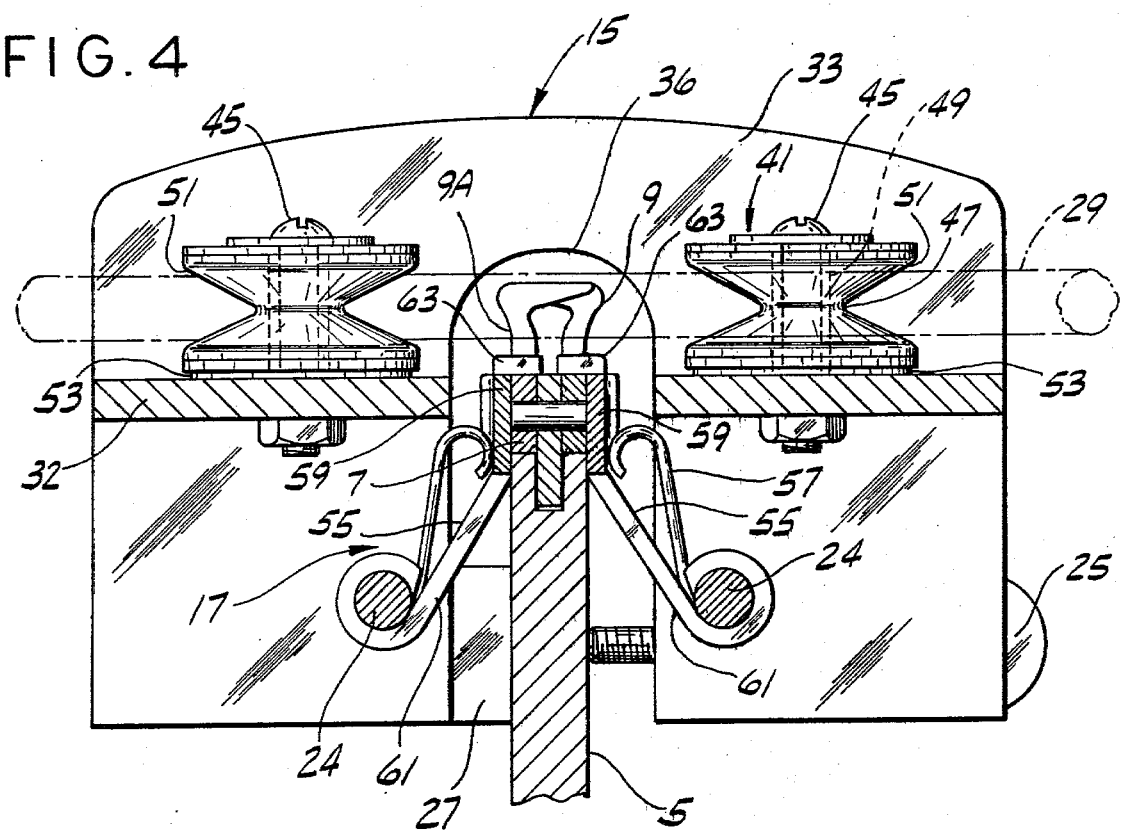
FIG. 4 is an enlarged section view along line 4—4 of FIG. 2.

In particular, the frame 13 comprises a forward end-piece 19 and a rear end-piece 20 each having a slot 21 extending upwardly from the lower end 23 thereof (see FIG. 3). The slots 21 are sized to receive the bar 5 and the chain 7 therein. The frame 13 further comprises two laterally spaced carriage support rods 24 extending between the end-pieces on opposite sides of slots 21 (see FIGS. 1 and 3). Each end-piece has a thumbscrew 25 received in a threaded hole extending through one leg of the end-piece. Each thumbscrew 25 is engageable at its threaded end with a side of the bar 5 for releasably securing the frame 13 to the bar 5. Each end-piece further has a lateral projection 27 at the side of the slot 21 opposite the thumbscrew 25 (see FIGS. 3 and 4). When the bar 5 of the saw 3 is engaged by the upstanding surface of each projection 27, the longitudinal center line of the frame 13 is at or closely adjacent to the longitudinal center line of the bar 5 and the axis of a file 29 guided for reciprocation by the carriage 15 will be in a plane perpendicular to the longitudinal central plane of the bar (see FIG. 4). A knurled-head bolt 30 adapted to be abutted by the carriage 15, when the carriage is moved rearwardly, is received in a longitudinally extending threaded hole at the upper end of the rear end-piece 20. A spring 31 is disposed between the rear end-piece 20 and the head of the bolt 30 for preventing unintended rotation of the bolt.

Figure 2:
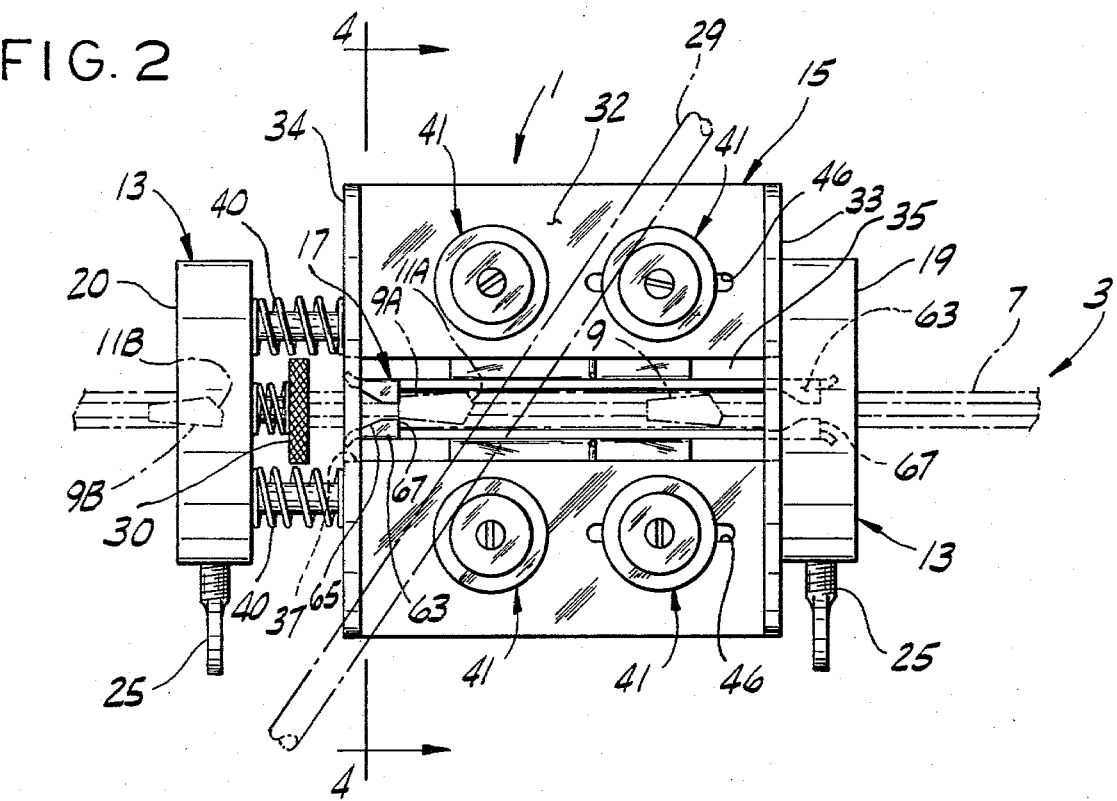
FIG. 2 is a plan of the file guide.

The carriage 15 is I-shaped and comprises a web 32, a forward flange 33 and a rear flange 34. The web 32 has a central slot 35 extending longitudinally thereof (see FIG. 2). The flanges 33 and 34 each have a central slot (36 and 37, respectively) extending downwardly from a point in an upper portion of the flange to the lower end of the flange. Slots 35, 36 and 37 are sufficiently wide to enable the bar 5 to be received therein. A pair of holes 38 are spaced laterally on opposite sides of slot 36 in flange 33 below the level of web 32 and are in axial alignment with another pair of holes 39 in the lower portion of the rear flange 34. The holes 38 and 39 receive the carriage support rods 24 in sliding engagement for enabling the carriage 15 to be moved forward to a position in which the forward flange 33 engages the forward end-piece 19 and to be moved rearward to a position in which the rear flange 34 engages the knurled-head bolt 30. Springs 40 carried on the carriage support rods 24 between the rear end-piece 20 and the rear flange 34 bias the carriage 15 forward. The rearmost position of the carriage 15 on the frame 13 can be adjusted by adjusting the position of the bolt 30 in the rear end-piece 20.

Two pairs of guide members 41 are mounted on the upper surface of the web 32. The guide members 41 are arranged at the corners of a rectangle with two guide members 41 on each side of the slot 35, so that a first pair of guide members at opposite corners of the rectangle guide the file 29 for reciprocation at a predetermined cutting angle relative to the first tooth 9A to be sharpened (see FIG. 2) and a second pair of guide members at the other corners of the rectangle guide the file 29 for reciprocation at a second predetermined cutting angle for the next tooth 9B to be sharpened. Each guide member 41 comprises a pulley mounted for rotation about a shaft 45 secured to the web 32 (see FIG. 4). The shaft 45 for one guide member 41 of each pair thereof is received in a slot 46 in the web 32, thus enabling the position of the guide member to be varied for adjusting the angle at which the file 29 is guided in a range from approximately 30° to approximately 40° relative to the teeth 9. The preferred cutting angle for the teeth of most chain saws is 35°. Each pulley has a groove 47 in the periphery thereof for guiding the file 29 both horizontally and vertically and is of a composite structure comprising a metal inner sleeve 49 in rotary sliding engagement with the shaft 45 and an outer ring 51 of a resilient material; perferably a rubber that is resistant to oil, ozone and abrasion. The resilient material should be sufficiently hard so as not to be excessively deformed by the file 29 yet not so hard as to be abraded by the file. Material having a hardness in the range of 60–70 Shore A has been found to be satisfactory. The resilient material not only reduces the wear on the file 29, but also has been found to be useful in removing metal shavings from the file 29, during the sharpening of the teeth, that would otherwise impair the effectiveness of the file. To restrict the deformation of the ring 51 of resilient material by the file 29, the ends of the metal inner sleeve 49 extend radially outwardly over the upper and lower ends of the ring 51. A washer 53 may be disposed beneath each guide member 41 to position the groove 47 in the guide member and, thus, the file 29 at the desired tooth cutting height, which height may vary depending upon the size of the chain saw teeth to be sharpened.

The stop 17 for holding the tooth 9A against rearward movement extends within the slots 35, 36 and 37 in the carriage 15 and the slot 21 in the forward end-piece 19. The stop 17 comprises a pair of upstanding guide plates 55, each guide plate having a rolled lower end mounted for pivotal movement about one of the carriage support rods 24 (see FIGS. 1 and 4). Coiled springs 57 secured to support rods 24 bias the plates 55 toward each other so that the plates at their upper end portions 59 engage the sides of the chain 7, when the frame 13 is mounted on the bar 5. Each plate 55 has an outwardly divergent lower portion 61 facilitating the mounting of the frame 13 on the bar 5 and a plurality of inwardly extending projections 63 at its upper end engageable with the upper surface of the chain 7. The projections 63 on each guide plate 55 are spaced longitudinally a distance at which simultaneous engagement of the projections 63 with two teeth 9 does not occur. With the frame 13 mounted on the bar 5 so that all of the projections 63 bear on the top of the chain 7, the upper surface of the web 32 as well as the axis of the file 29 will be parallel to the top surface of the chain 7. Each projection 63 has a rearward edge 65 angled relative to the direction of movement of the chain 7 and a forward edge 67 perpendicular to the direction of movement of the chain. A tooth 9, when moved forward, engages the rearward edge 65 of one of the guide plates 55 and pivots the plate 55 outwardly beyond the path of movement of the tooth. A tooth, upon moving rearwardly, engages the forward edge 67 of one of the projections 63 and is held against continued rearward movement. Thus, the projections 63 enable the chain 7 to be moved forward to advance successive teeth 9 into the file guide, but prevent teeth 9 from moving rearwardly away from the file 29 during sharpening thereof. To facilitate movement of the chain 7 through the guide plates 55, the forward and rearward ends of the upper portions 59 of the guide plates 55 are bent outwardly (see FIG. 2).

In operation, the file guide 1 is mounted on the bar 5 by positioning the frame 13 with the outwardly divergent lower portions 61 of the guide plates 55 generally above the bar 5, by lowering the frame 13 until all the projections 63 bear down on the chain 7, and by tightening the thumbscrews 25 against the bar 5 until the upstanding surfaces of the projections 27 are flush with the side of the bar. These operations result in the proper positioning of the frame 13 relative to the bar 5 vertically and horizontally. Prior to or after mounting the frame 13, the desired angle at which the file 29 is to be guided for reciprocation is set by adjusting and then securing the guide members 41 in the slots 46. The desired depth of filing the teeth may be set by adjusting the position of the knurled-head bolt 30 in the rear end-piece 20. The initial tooth 9A to be sharpened is then moved until its rearward edge engages the forward edge 67 of one of the rearward projections 63, thus positioning the tooth relative to the carriage 15. To sharpen the tooth 9A, the operator places the file 29 at the rearward side of the first pair of guide members 41 with one hand and grasps the rear end-piece 20 and the rear flange 34 of the carriage 15 with his other hand. The operator then pulls the carriage 15 rearwardly until the file 29 engages the forward or cutting edge 11A of the tooth 9A, at which point the operator pushes the file 29 through its cutting stroke to sharpen the tooth. The operator then allows the springs 40 to move the carriage 15 forwardly, to a point at which the file 29 no longer engages the tooth 9A, and thereafter pulls the file 29 back through its return stroke. The operator reiterates these movements of the carriage 15 and the file 29 until the carriage 15 at its rear flange 34 abuts the knurled-head bolt 30 at which point the tooth 9A will have been sharpened to the desired depth. To sharpen the next tooth 9B, the operator moves the chain 7 until the rearward side of the tooth 9B engages the forward edge 67 of one of the rearward projections 63 and places the file 29 at the rearward side of the second pair of guide members 41. The steps used for sharpening tooth 9A are repeated for tooth 9B. The remaining teeth 9 on the chain 7 are sharpened in a similiar manner.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A file guide for use in sharpening a chain saw, said chain saw comprising a bar, a chain around the periphery of the bar, and a plurality of teeth secured at intervals along the chain, each tooth having a cutting edge at one end thereof constituting its forward end in respect to the direction of movement of the chain, successive teeth of the saw being allochiral relative to each other; said guide comprising:

a frame adapted to be mounted on the bar of the chain saw having means for releasably securing it to the bar;

a carriage slidably mounted on the frame for forward and rearward movement relative to the tooth to be sharpened and having means for guiding a file for reciprocation at a predetermined angle relative to said tooth through a cutting stroke of the file for sharpening said tooth at said angle and a return stroke, said means for guiding the file comprising a pair of guide members one on one side of the tooth and the other on the other side of the tooth, said guide members being spaced longitudinally of the carriage; and a stop carried by the frame for holding the tooth against rearward movement;

said carriage being movable rearward so as to position the file in engagement with the cutting edge of the tooth for the cutting stroke of the file and being movable forward so as to position the file out of engagement with the cutting edge of the tooth for a return stroke of the file.

2. A file guide as set forth in claim 1 wherein said pair of guide members constitutes a first pair of guide members and wherein said file guide further comprises a second pair of guide members on the carriage for guiding the file for reciprocation at a second predetermined angle for the next tooth to be sharpened.

3. A file guide as set forth in claim 1 wherein each guide member comprises a pulley rotatably mounted on the carriage.

4. A file guide as set forth in claim 3 wherein each pulley has a groove in the periphery thereof, the file being engageable with each pulley at its grooved peripheral surface.

5. A file guide as set forth in claim 3 wherein each pulley comprises an outer ring of oil, ozone and abrasion resistant rubber.

6. A file guide as set forth in claim 5 wherein the rubber has a hardness in the range of 60–70 shore A.

7. A file guide as set forth in claim 5 wherein each pulley is mounted for rotation about a shaft extending upwardly from the carriage, each pulley further comprising a metal inner sleeve, the ends of each inner sleeve extending radially outwardly over the ends of the outer ring.

8. A file guide as set forth in claim 7 wherein the shaft for one of said pulleys is adjustably secured on the carriage so as to enable said shaft to be moved on the carriage relative to the tooth and said predetermined angle to be varied.

9. A file guide as set forth in claim 1 wherein the frame comprises two end-pieces and two elongate carriage supports, each of said end-pieces having a slot extending upwardly from the lower end thereof, said slots being adapted to receive the bar therein when the frame is mounted on the bar, said carriage supports being laterally spaced and extending between the end-pieces on opposite sides of the slots in the end-pieces.

10. A file guide as set forth in claim 9 wherein said means for releasably securing the frame to the bar comprises a thumbscrew threaded in each of said end-pieces at the lower end thereof, each thumbscrew being engageable with the bar.

11. A file guide as set forth in claim 9 wherein the carriage is slideably mounted on said supports, said carriage being slotted so as to receive the chain when the frame is mounted on the bar.

12. A file guide as set forth in claim 11 further comprising a spring carried by the frame for biasing the carriage forward into engagement with the end-piece at the forward end of the frame.

13. A file guide as set forth in claim 12 wherein the carriage has an flange at its rearward end for facilitating manual movement of the carriage rearwardly away from its spring-biased forward position.

14. A file guide as set forth in claim 13 further comprising means adjustably secured to the rear end-piece and engageable by said rear flange of the carriage for blocking rearward movement of the carriage beyond said means.

15. A file guide as set forth in claim 11 wherein the tooth stop comprises a pair of upstanding guide plates, each plate being connected to the frame for pivotal movement about an axis extending longitudinally of the frame, said plates being spring-biased inwardly toward each other so as to be engageable at upper portions thereof with the chain, said plates having outwardly divergent lower portions facilitating the mounting of the frame on the bar.

16. A file guide as set forth in claim 15 wherein each of said guide plates at their upper ends has two inwardly extending projections engageable with the top of the chain, when the frame is mounted on the bar, each projection having a rearward edge angled relative to the direction of movement of the chain for enabling forward movement of the tooth and a forward edge perpendicular to the direction of movement of the chain for blocking rearward movement of the tooth.

* * * * *